(12) United States Patent
Jackson et al.

(10) Patent No.: US 6,609,894 B2
(45) Date of Patent: Aug. 26, 2003

(54) AIRFOILS WITH IMPROVED OXIDATION RESISTANCE AND MANUFACTURE AND REPAIR THEREOF

(75) Inventors: Melvin Robert Jackson, Niskayuna, NY (US); Charles Gitahi Mukira, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/681,915

(22) Filed: Jun. 26, 2001

(65) Prior Publication Data

US 2002/0197152 A1 Dec. 26, 2002

(51) Int. Cl.⁷ .............................. F01D 5/18; F01D 5/28; F01D 9/06
(52) U.S. Cl. ............... 416/224; 416/241 R; 416/241 B; 415/200; 29/889.1; 29/889.7
(58) Field of Search .......................... 29/889.1, 889.2, 29/889.7; 415/115, 200; 416/97 R, 224, 229 A, 241 R, 241 B

(56) References Cited

U.S. PATENT DOCUMENTS

| | | | | |
|---|---|---|---|---|
| 3,215,511 A | * | 11/1965 | Chisholm et al. | 416/224 |
| 4,832,252 A | * | 5/1989 | Fraser | 416/224 |
| 5,062,205 A | * | 11/1991 | Fraser | 416/241 B |
| 5,427,866 A | * | 6/1995 | Nagaraj et al. | 416/97 R |
| 5,486,093 A | * | 1/1996 | Auxier et al. | 416/97 R |
| 5,584,663 A | | 12/1996 | Schell et al. | 416/241 R |
| 6,071,470 A | | 6/2000 | Koizumi et al. | |

OTHER PUBLICATIONS

Rh–Base Refractory Superalloys for Ultra–High Temperature Use, Y. Yamabe–Mitarai, Y. Koizumi, H. Murakami, Y. Ro, T. Maruko and H. Harada, Scripta Materialia, vol. 36, No. 4, pp. 393–398, 1997.

Ir–Base Refractory Superalloys for Ultra–High Temperatures, Y. Yamabe–Mitarai, Y. Ro, T. Maruko, and H. Harada, Metallurgical and Materials Transactions A, vol. 29A, Feb. 1998, pp. 537–549.

* cited by examiner

*Primary Examiner*—Edward K. Look
*Assistant Examiner*—Richard A. Edgar
(74) *Attorney, Agent, or Firm*—Paul J. DiConza; Noreen C. Johnson

(57) ABSTRACT

A gas turbine airfoil and methods for manufacturing and repair of an airfoil, the airfoil comprising a wall, the wall defining the perimeter of the airfoil and comprising a leading edge section and a trailing edge section, wherein a majority of the surface area of the wall comprises a first material, the first material having an oxidation resistance and a melting temperature, and at least one portion of the wall comprises a second material, the second material having an oxidation resistance that is greater than the oxidation resistance of the first material and a melting temperature that is at least about 83 degrees Celsius (about 150 degrees Fahrenheit) greater than the melting temperature of the first material, the at least one portion of the wall located in at least one section of the wall selected from the group consisting of the leading edge section and the trailing edge section.

107 Claims, 6 Drawing Sheets

AIRFOILS WITH IMPROVED OXIDATION RESISTANCE AND MANUFACTURE AND REPAIR THEREOF

BACKGROUND OF INVENTION

The present invention relates to components designed to operate at high temperatures. More particularly, this invention relates to airfoils for gas turbine engines and methods for manufacture and repair of such components.

In a gas turbine engine, compressed air is mixed with fuel in a combustor and ignited, generating a flow of hot combustion gases through one or more turbine stages that extract energy from the gas, producing output power. Each turbine stage includes a stator nozzle having vanes which direct the combustion gases against a corresponding row of turbine blades extending radially outwardly from a supporting rotor disk. The vanes and blades include airfoils having a generally concave "pressure" side and a generally convex "suction" side, both sides extending axially between leading and trailing edges over which the combustion gases flow during operation. The vanes and blades are subject to substantial heat load, and, because the efficiency of a gas turbine engine is proportional to gas temperature, the continuous demand for efficiency translates to a demand for airfoils that are capable of withstanding higher temperatures for longer service times.

Gas turbine airfoils on such components as vanes and blades are usually made of superalloys and are often cooled by means of internal cooling chambers and the addition of coatings, including thermal barrier coatings (TBC's) and environmentally resistant coatings, to their external surfaces. The term "superalloy" is usually intended to embrace iron-, cobalt-, or nickel-based alloys, which include one or more other elements including such non-limiting examples as aluminum, tungsten, molybdenum, titanium, and iron. The internal air cooling of turbine airfoils is often accomplished via a complex cooling scheme in which cooling air flows through channels within the airfoil ("internal air cooling channels") and is then discharged through a configuration of cooling holes at the airfoil surface. Convection cooling occurs within the airfoil from heat transfer to the cooling air as it flows through the cooling channels. In addition, fine internal orifices are often provided to direct cooling air flow directly against inner surfaces of the airfoil to achieve what is referred to as impingement cooling, while film cooling is often accomplished at the airfoil surface by configuring the cooling holes to discharge the cooling air flow across the airfoil surface so that the surface is protected from direct contact with the surrounding hot gases within the engine. TBC's comprise at least a layer of thermally insulating ceramic and often include one or more layers of metal-based, oxidation-resistant materials ("environmentally resistant coatings") underlying the insulating ceramic for enhanced protection of the airfoil. Environmentally resistant coatings are also frequently used without a TBC topcoat. Technologies such as coatings and internal air cooling have effectively enhanced the performance of turbine airfoils, but material degradation problems persist in turbine airfoils due to locally aggressive conditions in areas such as airfoil leading edges and trailing edges.

A considerable amount of cooling air is often required to sufficiently lower the surface temperature of an airfoil. However, the casting process and the cores required to form the cooling channels limit the complexity of the cooling scheme that can be formed within an airfoil at leading and trailing edges of vanes and blades. The resulting restrictions in cooling airflow often promote higher local temperatures in these areas relative to those existing in other locations on a given airfoil, giving rise to increased oxidation in these areas. In typical jet engines, for example, bulk average airfoil temperatures range between about 898° C. (about 1650° F.) to about 982° C. (about 1800° F.), while airfoil leading and trailing edges often reach about 1149° C. (about 2100° F.) or more. Maximum temperatures are expected in future applications to be over about 1315° C. (about 2400° F.). At such elevated temperatures, the oxidation process consumes metal parts, forming a weak, brittle metal oxide that is prone to chip or spall away from the part. In addition to oxidation, erosion due to impact of particles entrained in the gas flow often occurs at airfoil leading edges, completely removing the TBC from the area and exposing the base metal to the hot gas flow, increasing the local rate of material removal due to oxidation and wear.

Erosion and oxidation of material at the edges of airfoils lead to degradation of turbine efficiency. As airfoils are worn away, gaps between components become excessively wide, allowing gas to leak through the turbine stages without the flow of the gas being converted into mechanical energy. When efficiency drops below specified levels, the turbine must be removed from service for overhaul and refurbishment. A significant portion of this refurbishment process is directed at the repair of the specific areas of the airfoils described above. For example, damaged material is removed and then new material built onto the blade by welding with filler material or by laser deposition of metal powders.

In current practice, the original edge material is made of the same material as the rest of the original blade, often a superalloy based on nickel or cobalt. Because this material was selected to balance the design requirements of the entire blade, it is generally not optimized to meet the special local requirements demanded by conditions at the airfoil leading or trailing edges. The performance of alloys commonly used for repair is comparable or inferior to that of the material of the original component, depending upon the microstructure of the repaired material, its defect density due to processing, and its chemistry. For example, many turbine airfoils are made using alloys that have been directionally solidified. The directional solidification process manipulates the orientation of metal crystals, or grains, as the alloy is solidified from the molten state, lining the grains up in one selected primary direction. The resultant alloy has enhanced resistance to high temperature deformation, referred to as "creep," during service when compared to conventionally processed materials. Advanced applications employ alloys made of a single crystal for even further improvements high temperature properties. However, when these components are repaired by conventional processes, using build-up of weld filler material, the resulting microstructure of the repair is typical of welded material, not directionally solidified or single-crystalline. Other repair methods, such as applying powder mixtures wherein one powder melts and densifies the repaired area during heat treatment, results in microstructures different from the parent alloy. Such microstructures, present in a conventional airfoil material such as a superalloy, may cause the airfoil to require excessively frequent repairs in advanced designs that rely on the benefits of directional solidification or single crystal processing to maintain performance.

The term "oxidation resistance" is used in the art to refer to the amount of damage sustained by a material when exposed to oxidizing environments, such as, for example, high temperature gases containing oxygen. Oxidation resistance is generally measured as the rate at which the weight of a specimen changes per unit surface area during exposure at a given temperature. In many cases, the weight change is measured to be a net loss in weight, as metal is converted to oxide that later detaches and falls away from the surface. In other cases, a specimen may gain weight if the oxide tends to adhere to the specimen, or if the oxide forms within the specimen, underneath the surface, a condition called "internal oxidation." A material is said to have "higher" or "greater" oxidation resistance than another if the material's rate of weight change per unit surface area is closer to zero than that of the other material for exposure to the same environment and temperature.

The so-called "platinum group" of metal elements comprises rhodium (Rh), osmium (Os), platinum (Pt), iridium (Ir), ruthenium (Ru), palladium (Pd), and rhenium (Re) elements noted for high chemical resistance. Several elements from this group are noteworthy as examples of materials with substantially higher oxidation resistance relative to current airfoil materials. Some platinum group metals and several alloys based on platinum group metals possess excellent resistance to oxidation at temperatures exceeding the capabilities of many Ni-based superalloys. The class of materials referred to as "refractory superalloys" offer additional strength over the platinum group metals, though at the expense of some oxidation resistance. These alloys are based on Ir or Rh, with transition metal additions of up to about 20 atomic percent, and are strengthened by a precipitate phase of generic formula M3X, where M is Rh or Ir and X is typically Ti, V, Ta, or Zr, or combinations thereof. Some alloys of this type can withstand 1–2 hour exposures to at least about 1593° C. (about 2900° F.) without catastrophic oxidation. Use of materials incorporating platinum-group metals has been restrained to date due to the high density and very high cost of these materials in comparison to more conventional airfoil materials.

SUMMARY OF INVENTION

The selection of a particular alloy for use in a given airfoil design is accomplished based on the critical design requirements for a number of material properties, including strength, toughness, environmental resistance, weight, cost, and others. When one alloy is used to construct the entire airfoil, compromises must be made in the performance of the airfoil because no single alloy possesses ideal values for the long list of properties required for the airfoil application, and because conditions of temperature, stress, impingement of foreign matter, and other factors are not uniform over the entire airfoil surface.

It would be advantageous if the performance of both newly manufactured and repaired airfoils could be improved to better withstand the aggressive environments present in localized areas on turbine components. However, it would not be desirable if improvements to environmental resistance were effected at the expense of other design critical requirements of the airfoil. For example, a blade made of pure platinum would have excellent oxidation resistance, but would lack the needed strength and would cost many times the price of a blade made of conventional superalloy material. Therefore, it would be beneficial if turbine airfoils could be improved in a manner that would allow for enhanced performance in regions susceptible to damage due to locally aggressive conditions without significantly detracting from the overall performance of the airfoil.

In one aspect of the present invention, a gas turbine airfoil is provided which comprises a wall, the wall defining the perimeter of the airfoil and comprising a leading edge section and a trailing edge section, wherein a majority of the surface area of the wall comprises a first material, the first material having an oxidation resistance and a melting temperature, and at least one portion of the wall comprises a second material, the second material having an oxidation resistance that is greater than the oxidation resistance of the first material and a melting temperature that is at least about 83 degrees Celsius (about 150 degrees Fahrenheit) greater than the melting temperature of the first material, the at least one portion of the wall located in at least one section of the wall selected from the group consisting of the leading edge section and the trailing edge section.

Another aspect of the invention provides a method for repairing a gas turbine airfoil, the method comprising: a. providing an airfoil comprising a wall, the wall defining the perimeter of the airfoil and comprising a leading edge section and a trailing edge section, and further comprising a first material with a melting temperature and an oxidation resistance; b. removing at least one portion of the wall, the at least one portion located in at least one section of the wall selected from the leading edge and the trailing edge; c. providing a second material, the second material having an oxidation resistance that is greater than the oxidation resistance of the first material and a melting temperature that is at least about 83° C. (about 150 degrees Fahrenheit) greater than the melting temperature of the first material; and d. disposing the second material onto the wall in the at least one section where the at least one portion of the wall was removed.

Another aspect of the invention provides a method for manufacturing a gas turbine airfoil, the airfoil comprising a wall, the wall having a cross-sectional thickness that is specified to a nominal dimension, the wall defining the perimeter of the airfoil and comprising a leading edge section and a trailing edge section, and further comprising a first material with a melting temperature and an oxidation resistance, the method comprising: a. providing an airfoil with a deficit in cross-sectional wall thickness, relative to the specified nominal cross-sectional wall thickness dimension, in at least one section of the wall, the section selected from the leading edge section and the trailing edge section; b. providing a second material, the second material having an oxidation resistance that is greater than the oxidation resistance of the first material and a melting temperature that is at least about 83° C. (about 150 degrees Fahrenheit) greater than the melting temperature of the first material; and c. disposing the second material onto the wall at the at least one section such that the deficit in cross-sectional wall thickness is eliminated.

Another aspect of the invention provides an insert for repair and manufacture of a gas turbine airfoil, the airfoil comprising a wall, the wall having an outer surface, the wall defining the perimeter of the airfoil and comprising a leading edge section and a trailing edge section, the wall further comprising a first material with a melting temperature and an oxidation resistance, the insert comprising an outer surface that is shaped such that the outer surface of the insert conforms with the outer surface of the wall at a section of the wall selected from the group consisting of the leading edge section and the trailing edge section, the insert comprising a second material, the second material having oxidation resistance that is greater than the oxidation resistance of the first material and a melting temperature that is at least about 83° C. (about 150 degrees Fahrenheit) greater than the melting temperature of the first material.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Structure, manufacture, and repair embodiments of the present invention are useful for components that operate at elevated temperatures, and particularly components of gas turbine engines such as the airfoils on blades (also referred to as "buckets") and vanes (also referred to as "nozzles") where the maximum metal temperatures typically range from about 982° C. (about 1800° F.) to over about 1204° C. (about 2200° F.) in current systems and temperatures over about 1315° C. (about 2400° F.) are envisioned for future applications.

Figure 1:
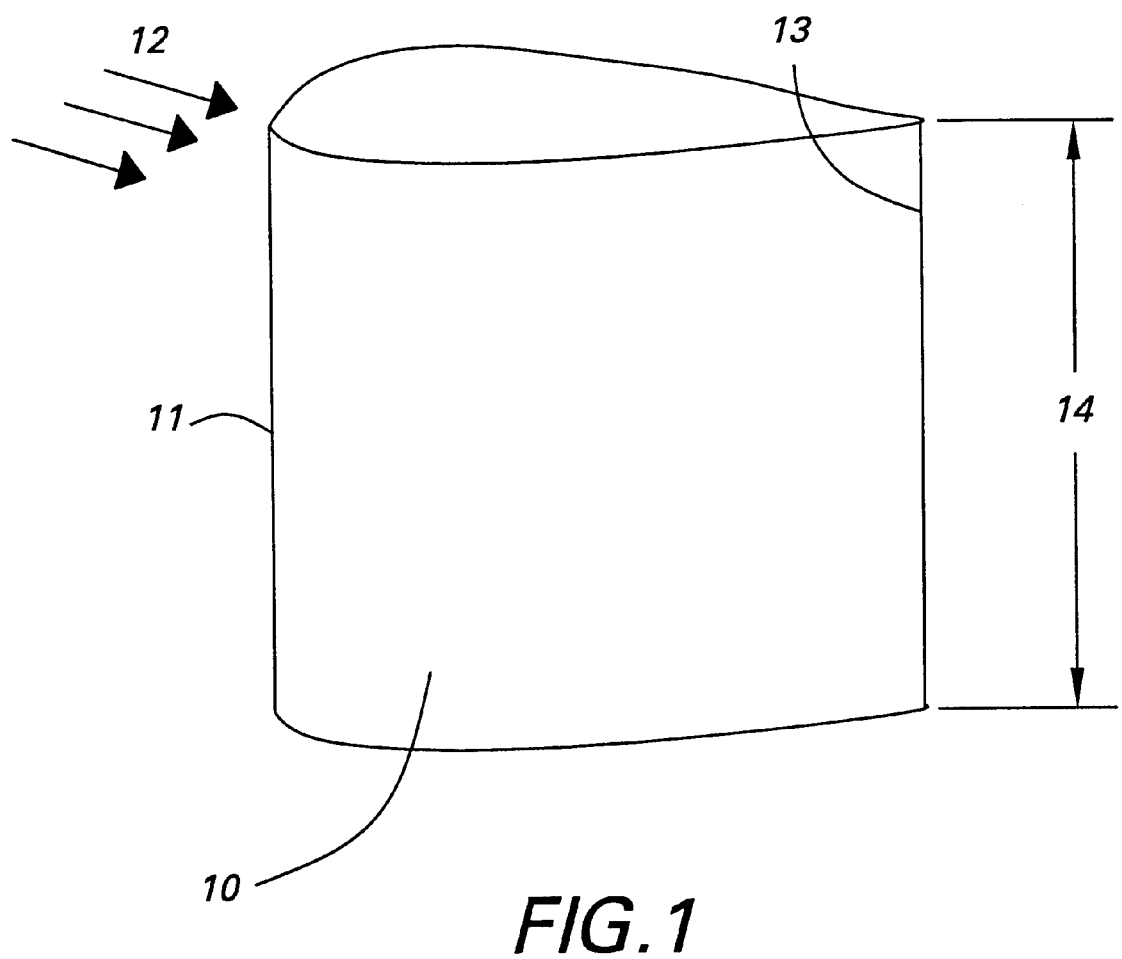
FIG. 1 is an isometric view of a conventional airfoil.
Figure 2:
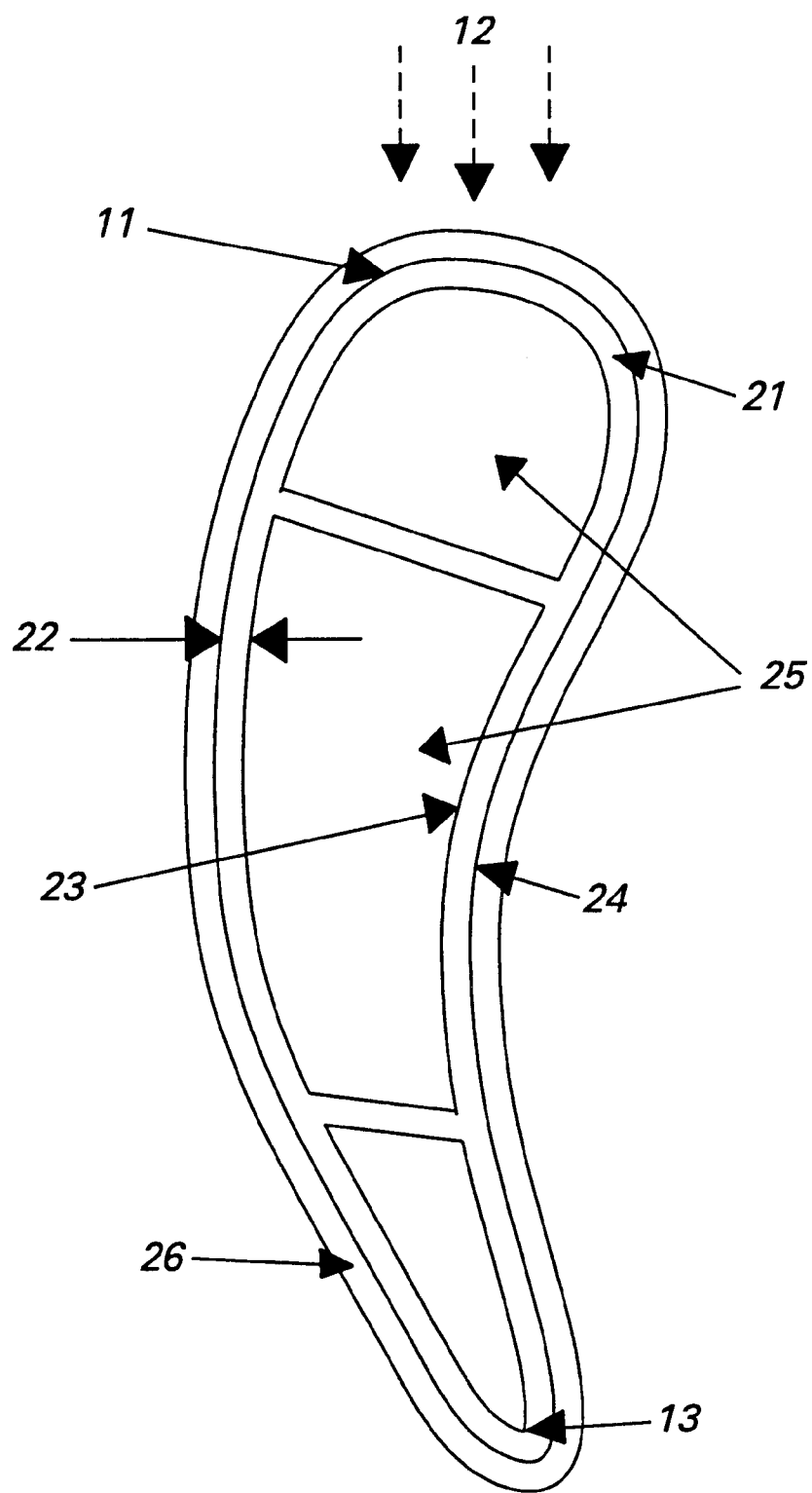
FIG. 2 is a cross sectional view of the airfoil of FIG. 1.

Referring to FIG. 1, a gas turbine airfoil 10 comprises a leading edge 11 located at the edge of the airfoil which, during operation, is first contacted by the flow of gas 12; and a trailing edge 13 located at the edge of the airfoil on the opposite side of the airfoil from the leading edge 11. The cross-sectional view of the airfoil in FIG. 2 shows that the airfoil further comprises a wall 21 that defines the perimeter of the airfoil, and the wall 21 has a cross-sectional wall thickness 22 that is not necessarily uniform along the entire airfoil perimeter. The airfoil wall 21 further comprises an inner surface 23 and an outer surface 24. Typical airfoils further comprise at least one internal air cooling channel 25. A coating 26, comprising at least one of a thermal barrier coating, an environmentally resistant coating, or combinations thereof, is optionally applied to the outer surface 24 of the airfoil. The coating 26 comprises at least one layer, and optionally, in the case where a combination of a ceramic thermal barrier coating and an environmentally resistant coating is employed, a plurality of layers.

Wall thickness 22 and any purposeful variation of the wall thickness along the perimeter of the airfoil uniformity depend upon the particular airfoil design under consideration. Typically, important design parameters, including wall thickness, have preferred, or "nominal" values and tolerance ranges documented in technical specifications for the purposes of quality control. Thus it is commonly accepted in the art to refer to, for example, a "specified nominal wall thickness" which in this example would signify the nominal wall thickness documented for a given location on the wall in the pertinent technical specification.

Figure 3:
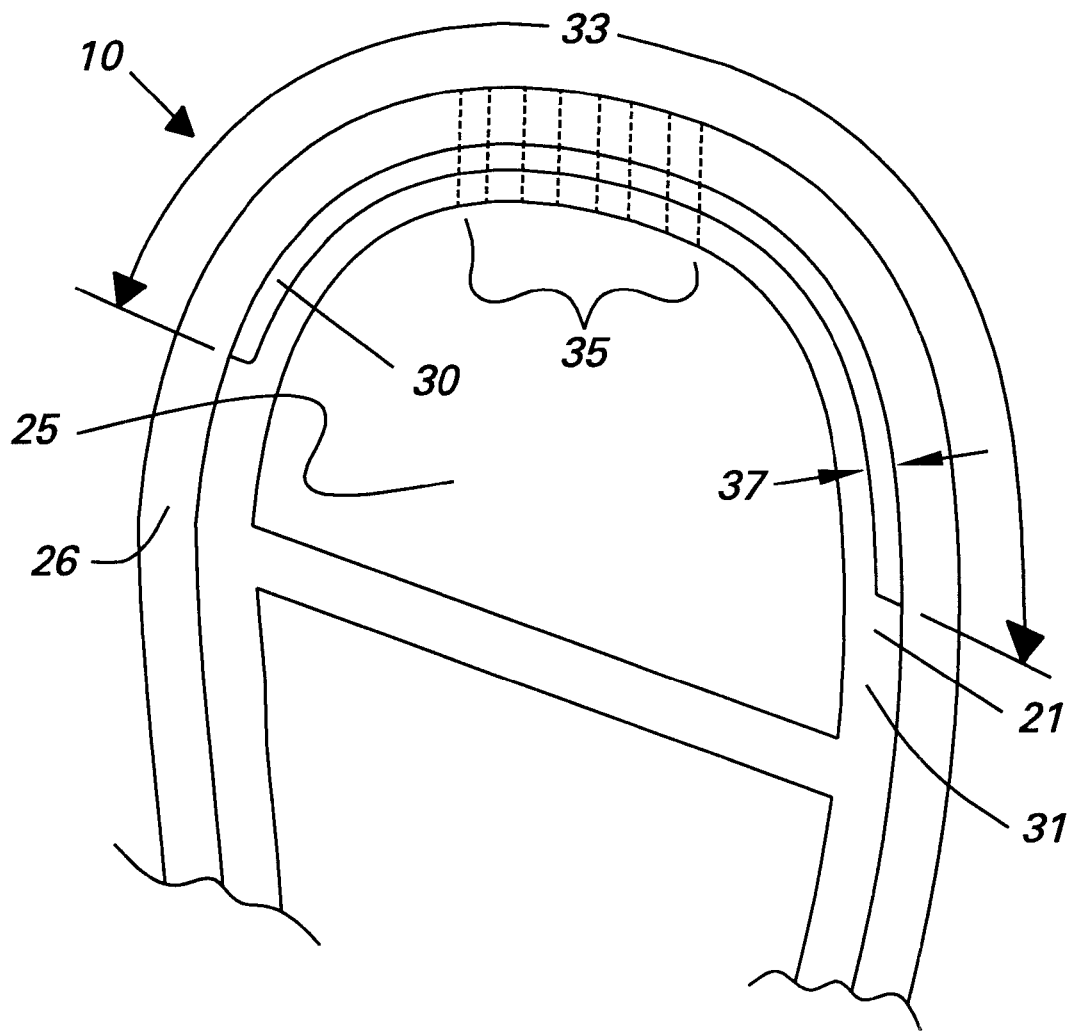
FIG. 3 is a cross section of an airfoil wall with part of the wall thickness comprising a second material in accordance with one embodiment of the present invention.

According to embodiments of the present invention, a non-limiting example of which is depicted in FIG. 3, a gas turbine airfoil 10 comprises a wall 21 defining the perimeter of the airfoil and comprising leading edge and trailing edge sections 11 and 13 (FIG. 2), wherein a majority (greater than about 50%) of the surface area of the wall comprises a first material 31 having an oxidation resistance and a melting temperature (temperature at which liquid metal begins to form as the material is heated), and at least one portion of the wall comprises a second material 30 having an oxidation resistance that is greater than the oxidation resistance of the first material and a melting temperature that is at least about 83° C. (about 150 degrees Fahrenheit) greater than the melting temperature of the first material. Having the melting temperature for second material 30 be at least about 83° C. (about 150° F.) higher than the melting temperature of the first material 31 provides enhanced stability to the airfoil in the presence of high localized temperatures at hot-spots. The at least one portion of the wall is located in at least one section of the wall selected from the group consisting of the leading edge section and the trailing edge section.

In one embodiment of the present invention, the portion of the wall comprising the second material 30 comprises a range of from about 0.13 mm (about 0.005") to about 0.64 mm (about 0.025") of the cross-sectional thickness of the wall. In a more specific embodiment, the portion of the wall comprising the second material comprises a range of from about 0.13 mm (about 0.005") to about 0.38 mm (about 0.015"). In one embodiment, the portion of the wall comprising second material comprises at least about 30% of the airfoil wall height 14 and the arc length 33 of this portion of the wall comprises a range from about 10% to about 50% of the total perimeter of the airfoil wall, preferably from about 10% to about 25%. In certain embodiments of this invention, a coating 26 is applied to the airfoil to afford even further high-temperature protection. In other embodiments, the airfoil 10 further comprises at least one internal air cooling channel 25 to allow for internal air cooling of the airfoil section during service. Still other embodiments provide for the second material 30 to further comprise a plurality of cooling holes 35 to provide additional cooling to the surface of the airfoil wall. Any of a variety of processes is suitable to create the cooling holes 35, including, but not limited to, electric discharge machining (EDM), laser drilling, and electron beam drilling.

According to embodiments of the present invention, the disposition of the second material 30 is accomplished such that the second material comprises at least a fraction of the cross-sectional thickness of the airfoil wall 21. This is distinct from the optional addition of a coating 26, which is disposed on the outer surface 24 of the airfoil wall.

The airfoil leading edge and trailing edge often reach temperatures over about 225° C. (about 400° F.) higher than the average temperature of the airfoil. As such, these particular locations are collectively referred to herein as "hot-spots." Because of the particularly aggressive thermal environment present at hot-spots, oxidation resistance is one of several primary performance characteristics required for materials in these sections. The temperature range of interest in references to oxidation resistance herein includes the range from about 982° C. (about 1800° F.) to about 1315° C. (about 2400° F.).

As discussed above, according to an embodiment of the present invention, the second material 30 has an oxidation resistance that is greater than the oxidation resistance of the first material 31 and a melting temperature that is at least about 83 degrees Celsius (about 150 degrees Fahrenheit) greater than the melting temperature of the first material. In certain embodiments of the invention, the first material 31 is a superalloy material, such as, but not limited to, a nickel-based superalloy. The first material is conventionally cast in certain embodiments, while in others the first material is directionally solidified. Still other embodiments employ a single-crystal material as the first material. The directionally solidified and single crystal embodiments are provided to enhance the high temperature performance of the airfoil during service. Several materials possess sufficiently high levels of melting temperature and oxidation resistance needed for use as the second material 30 in the embodiments of the present invention. Where the thickness 37 of the second material disposed on the airfoil wall is less than the total thickness 22 of the wall, the portion of the wall thickness comprising first material 31 is available to carry the load during service.

Materials selected from the group consisting of rhodium (Rh), platinum (Pt), palladium (Pd), and mixtures thereof show sufficient strength and oxidation resistance for use as the second material. In particular embodiments of the present invention, the second material comprises Rh at a level of at least about 65 atomic percent.

Figure 4:
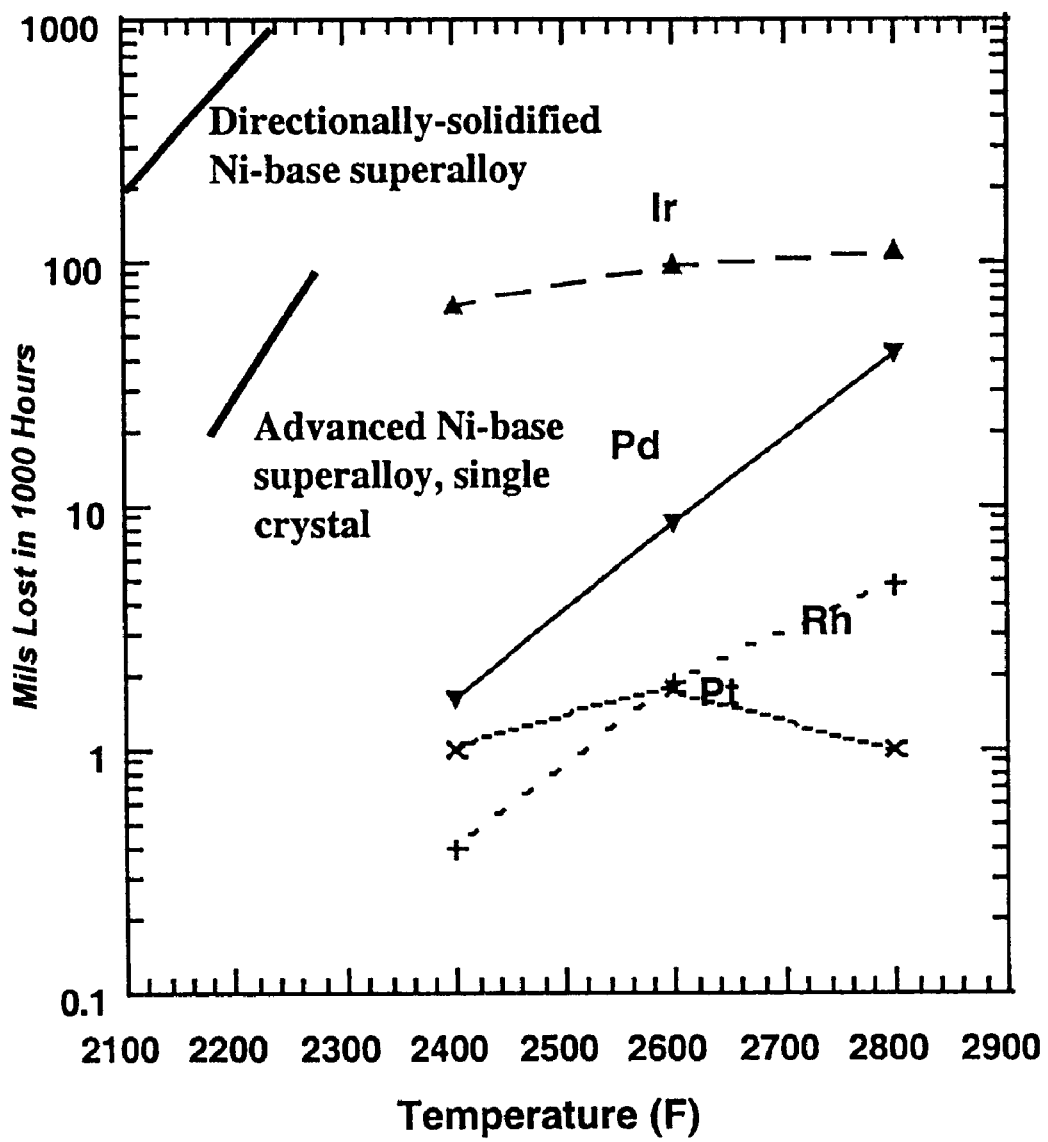
FIG. 4 is a graph displaying oxidation data for several platinum-group metals and two conventional superalloy materials.

FIG. 4 is a graph showing oxidation data for Pt, Rh, Pd, and iridium (Ir) as well as for two conventional airfoil materials, a directionally solidified Ni-base superalloy and a single crystal Ni-base superalloy of a different composition than the former alloy. The test performed to generate this data used metal specimens that were identical in size and each was exposed for the same amount of time (1000 hours), and so the change in specimen diameter is plotted as a direct measure of oxidation effects in order to compare material performance. Although each of the platinum group metals showed lower losses of metal than would be expected for the two superalloys for temperatures above about 1315° C. (about 2400° F.), Ir was the worst of the platinum group metals tested and its oxidation rate was deemed to be too high for use as a major (>30 atomic percent) component of the second material described for the present invention. Ruthenium (Ru) shows similar performance to Ir under these conditions. However, these elements are useful as minor alloying additions, and in certain embodiments of the invention, the second material comprises a metal selected from the group consisting of Ir, Ru, and mixtures thereof, at a level of up to about 5 atomic percent.

In certain embodiments, the second material comprises a material selected from the group consisting of Rh, Pt, Pd, and mixtures thereof, and further comprises a quantity of additional material, where the quantity of additional material comprises at least one supplementary element selected from the group consisting of titanium (Ti), vanadium (V), zirconium (Zr), niobium (Nb), molybdenum (Mo), hafnium (Hf), tantalum (Ta), tungsten (W), and mixtures thereof. These alloys do not resist oxidation to the levels shown by the Pt-group metals themselves, but their performance is often suitable for use in embodiments where increased strength is required of the second material, such as where the second material comprises the entire cross sectional wall thickness. In particular embodiments, the at least one supplemental element is present in the second material at a level of up to about 7 atomic percent. In other embodiments, the quantity of additional material comprises a plurality of supplemental elements, each supplemental element selected from the same group as listed above for the at least one supplementary element. In certain of these embodiments comprising a plurality of supplemental elements, the quantity of additional material is present in the second material at a level at or below about 10 atomic percent.

The second material, as employed in alternative embodiments of the present invention, further comprises chromium (Cr), which provides additional oxidation resistance to the material. In particular embodiments, the Cr is present at a level of up to about 25 atomic percent. Certain embodiments further comprise aluminum (Al), and in particular embodiments the Al is present at a level of up to about 18 atomic percent. In other embodiments, the second material further comprises nickel (Ni), which in certain embodiments is present at a level of up to about 45 atomic percent.

The collection of alloys discussed above does not represent an exhaustive list of all possible materials that may be employed to form embodiments of the present invention. These materials are discussed in order to illustrate the concepts of the present invention and the manner in which their properties can be advantageously exploited to achieve improved turbine airfoil life. A significant benefit of embodiments of the present invention is that the advantages of the second material are applied without sacrificing the overall design requirements of the component, because the second material is disposed only in the sections of the airfoil wall that require the extraordinary properties, while the remainder of the airfoil comprises first material, selected in accordance with the pertinent design requirements for the particular airfoil. Potentially disadvantageous properties of certain second materials, such as high cost or density, have a reduced effect on the overall airfoil because the second material comprises only a fraction of the overall surface area of the airfoil. The properties of the airfoil are thus "tailored" to the expected localized environments, reducing the need for compromise during the design process for new airfoils, and increasing the expected lifetime for repaired articles operating in current systems.

Another embodiment of the invention provides a method for repairing a gas turbine airfoil 10 as described above, the method comprising removing at least a portion of the wall 21, the at least one portion located in at least one section of the wall selected from the leading edge 11 and the trailing edge 13; providing a second material 30, and disposing the second material 30 onto the wall 21 in the at least one section where the at least one portion of the wall was removed. The first and second materials have the same characteristics as previously discussed for the first and second materials in other embodiments, above. Removal of a section of the airfoil wall is achieved by any of a number of material removal processes, including, but not limited to drilling, grinding, or cutting processes, such as electrical discharge machining (EDM). The amount of material removed depends on the extent of the service damage being repaired, the particular service conditions operative in the turbine being repaired, the particular section where the at least one portion of the wall was removed (herein referred to as "repair site"), the type of process to be used to replace the removed material, and other factors. All of the damaged material is removed, and additional undamaged material may further be removed in cases where a larger amount of highly oxidation resistant material is judged to be required based on an analysis of the particular turbine operating conditions.

Once a suitable amount of first material has been removed from the repair site, second material 30 is provided by any suitable method, and disposed onto the wall at the repair site. In some embodiments, providing the second material comprises providing a freestanding insert as described below. In alternative embodiments, disposing comprises depositing the second material by a process selected from the group consisting of electron beam physical vapor deposition, chemical vapor deposition, ion plasma deposition, thermal spraying, electroplating, and laser powder deposition. As another alternative, second material is provided in the form of braze tape. For the case where the second material is provided as a freestanding insert, any of a variety of suitable joining methods is used to join the insert to the airfoil wall, including processes such as welding, brazing, and diffusion bonding processes, for example.

The alternatives for the composition of the second material discussed previously for the airfoil embodiments are also applied in certain repair method embodiments. In particular embodiments, disposing is accomplished such that the second material comprises the same cross-sectional thickness ranges described for airfoil embodiments.

In some cases, special consideration regarding the selection of the joining process is required, especially where large differences in melting point exist between the airfoil material and the second material. For example, where the first material comprises a Ni-based superalloy with an exemplary melting temperature range from about 1289° C. (about 2350° F.) to about 1358° C. (about 2475° F.) and the second material comprises a large amount of a platinum-group metal, with a melting temperature of at least about 1539° C. (about 2800° F.), the employment of a joining process that generates low heat input into the airfoil is useful to avoid overheating the airfoil material. For example, brazing techniques and diffusion bonding processes are less likely to overheat the airfoil than welding processes. Diffusion bonding comprises bringing the components to be joined into intimate contact and heating them to a sufficiently high temperature such that solid-state diffusion occurs at the interface between the two components, forming a continuous solid bond. Fixtures (not shown) are used to ensure intimate contact is maintained throughout the procedure. In one embodiment of the present invention, the temperature is at least 2200° F. so that a suitable bond can be achieved in about 4 hours.

For the case where disposing the second material comprises depositing the second material by one of the processes described above, particular embodiments provide that disposing further comprises depositing the second material directly on the airfoil wall. In such embodiments the deposited material will have an inherent bond to the airfoil, whether through mechanical bonding or an actual metallurgical bond, without excessively heating the airfoil. For the case where the second material 30 is provided in the form of braze tape, the bond is formed during the processing of the tape. In this case a tape comprising a majority of a Pt-group element, such as, for example, Rh, further comprises a low-melting constituent, such as, for example, aluminum (Al), which during processing melts and reacts with the Rh to form a structure with a high melting point and a small amount of Rh—Al intermetallic. The tape forming the airfoil section is bonded to the rest of the airfoil during the melting and re-solidification of the braze material.

In certain embodiments, after the second material has been disposed onto the airfoil, further process steps are used to ensure the repaired airfoil meets design requirements for proper operation. Examples of such requirements include, but are not limited to, surface finish specifications, dimensional requirements, and bond strength requirements for the bond joining the second material to the airfoil wall. In one embodiment, a step of heat treating the repaired airfoil is used to improve the bonding between the second material and the airfoil, to relieve stresses accumulated by the repair process, and to improve the metallurgical condition of the overall part in terms of its grain size and precipitate phase distribution. Such a heat treatment step is typically done in vacuum or in an inert gas to avoid oxidizing the part, and is carried out using the process specified for the particular alloy comprising the first material to ensure its metallurgical properties are within the range specified for the airfoil when processing is completed. In other embodiments, the repaired airfoil may also undergo one or more machining operations, including grinding, milling, or other such processes, to restore the airfoil to specified final dimensions and surface finish requirements. In certain embodiments this machining step includes a process such as grinding to provide a surface finish for the repaired airfoil that meets the pertinent specification limit. Certain embodiments call for a coating 26 to be applied to the airfoil to afford even further high-temperature protection.

Figure 5:
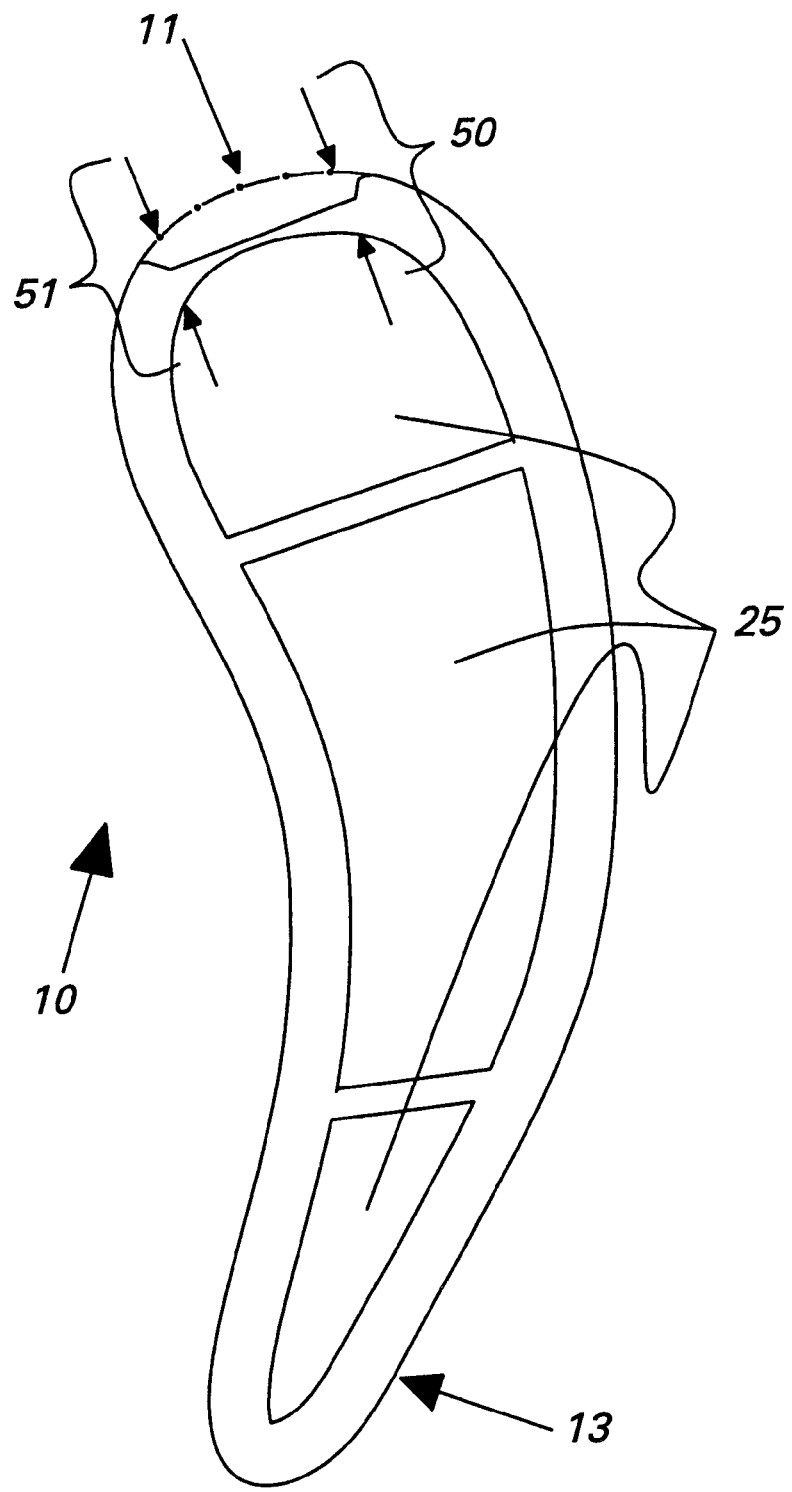
FIG. 5 is a cross section of an airfoil with a deficit in cross sectional wall thickness relative to the specified nominal cross-sectional wall thickness.

Certain embodiments of the present invention relate to a method for manufacturing a gas turbine airfoil. Referring to FIG. 5, one step comprises providing an airfoil 10, comprising first material, with a deficit 50 in cross-sectional wall thickness, relative to the specified nominal cross-sectional wall thickness dimension 51, in at least one section of the airfoil wall selected from the leading edge section 11 and the trailing edge section 13. As a non-limiting example, depicted in FIG. 5, a gas turbine airfoil is made using processes to manufacture a standard turbine airfoil, except that the airfoil is made in such a way as to require an additional amount of material at, for example, the leading edge, in order to meet the design specification for the given turbine airfoil. In this example, second material is provided and disposed at the leading edge 11 such that the deficit 50 is eliminated. In the manufacturing method embodiments, the second material is provided using techniques described above for the repair method embodiment, such that the deficit in cross-sectional thickness is eliminated.

The alternatives for the composition of the second material discussed previously for the airfoil embodiments are also applied in certain manufacturing method embodiments. In particular embodiments, disposing is accomplished such that the second material comprises the same cross-sectional thickness ranges set forth for the second material in the airfoil embodiments, above. Furthermore, the alternative embodiments relating to aspects of the providing and disposing steps, set forth above for the repair method embodiments, are also pertinent to the manufacturing method embodiments of the present invention.

In certain embodiments, heat treatment and machining steps are included in the manufacturing process, for the same reasons as described above for repair method embodiments, as is the step of applying a coating 26 (FIG. 2) to the airfoil to afford further high-temperature protection. Particular embodiments provide that the airfoil 10 further comprises at least one internal channel 25 to allow for internal air cooling of the airfoil section during service, and as described above for the repair method embodiments, certain embodiments of the invention include creating a plurality of cooling holes 35 (FIG. 3) in the second material using any of the aforementioned processes.

Figure 6:
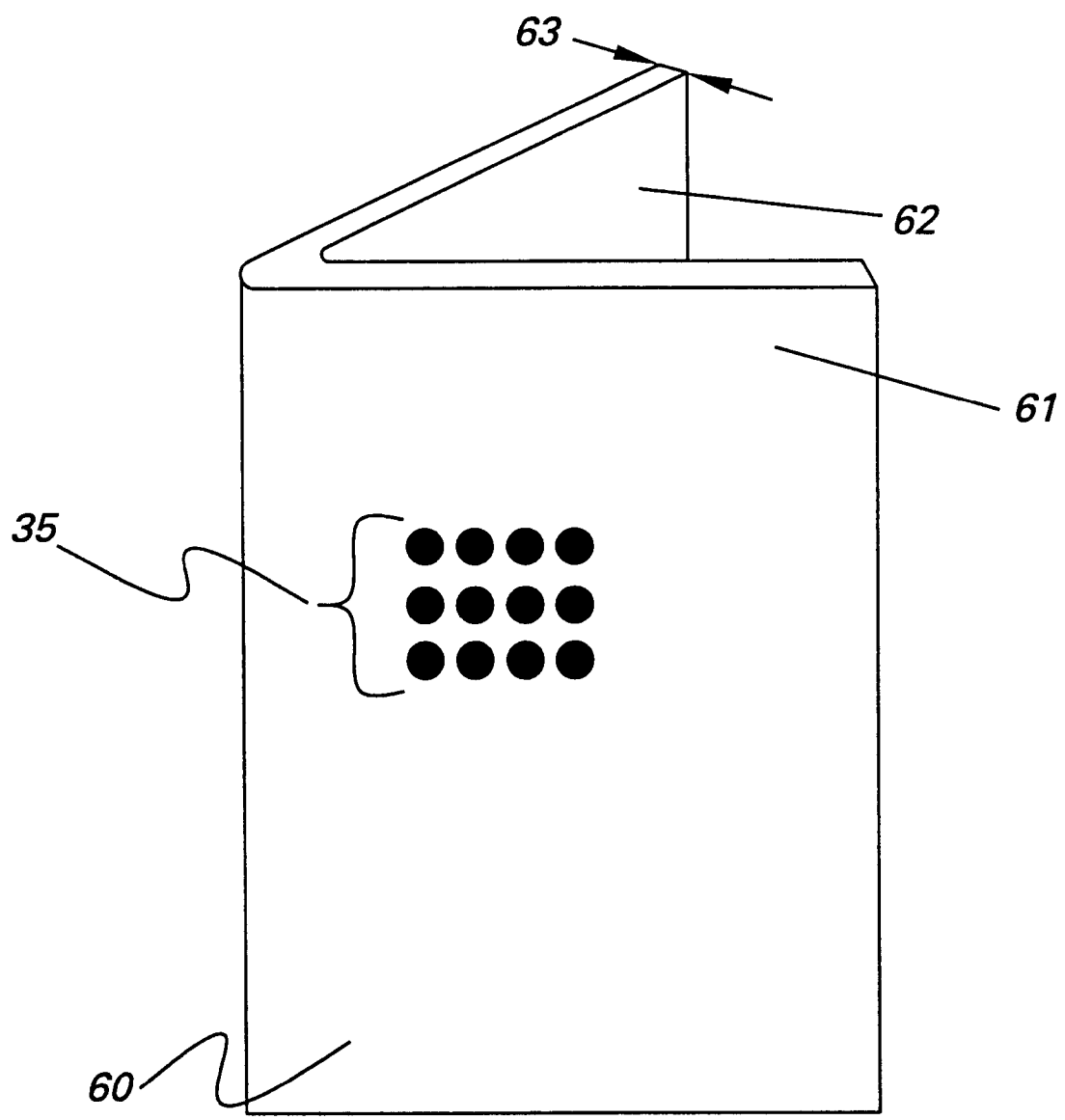
FIG. 6 depicts a non-limiting example of an insert, showing the cross sectional thickness and the inner and outer surfaces in accordance with another embodiment of the present invention.

Another embodiment of the invention, a non-limiting example of which is depicted in FIG. 6, provides an insert 60 for repair and manufacturing of a gas turbine airfoil, comprising an outer surface 61 that is shaped such that the outer surface 61 conforms with the outer surface 24 (FIG. 2) of the airfoil wall at a section of the airfoil wall, the section selected from the group consisting of the leading edge section 11 (FIG. 2) and the trailing edge section 13 (FIG. 2). As in previously described embodiments, the airfoil comprises a first material, and the insert comprises a second material, both the first material and the second material having the characteristics described for the first material and the second material in previously discussed embodiments. In particular embodiments of this invention, the insert further comprises a cross-sectional thickness 63 that is within the ranges set forth for the second material 30 (FIG. 3) in previous embodiments. The alternatives for the composition of the second material, discussed previously for the airfoil, repair method, and manufacturing method embodiments are also applied in certain insert embodiments. Embodiments relating to the existence of at least one cooling channel 25 (FIG. 3) in the airfoil and a plurality of cooling holes 35 (FIG. 3), as described above for airfoil embodiments, are also provided for certain insert embodiments.

According to the embodiments of this invention, any of a variety of metal fabrication and processing methods is suitable to fabricate the insert. Examples of suitable processes include, but are not limited to, casting; forging; extruding; in-situ processing of braze tape; or forming on a sacrificial mandrel by deposition processes such as electron beam physical vapor deposition, chemical vapor deposition, ion plasma deposition, thermal spraying, and electroplating.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A gas turbine airfoil, comprising:
   a wall, said wall defining the perimeter of said airfoil and comprising a leading edge section and a trailing edge section,
   wherein a majority of the surface area of said wall comprises a first material, said first material having an oxidation resistance and a melting temperature, and at least one portion of said wall comprises a second material, said second material having an oxidation resistance that is greater than the oxidation resistance of said first material and a melting temperature that is at least about 83 degrees Celsius (about 150 degrees Fahrenheit) greater than the melting temperature of said first material, wherein said second material comprises a material selected from the group consisting of Rh, Pt, Pd, and mixtures thereof, and wherein said second material further comprises a metal selected from the group consisting of Ir, Ru, and mixtures thereof, at a level of up to about 5 atomic percent,
   said at least one portion of said wall located in at least one section of said wall selected from the group consisting of the leading edge section and the trailing edge section.

2. The airfoil of claim 1, wherein said airfoil comprises a gas turbine component selected from the group consisting of a blade and a vane.

3. The airfoil of claim 1, wherein said first material comprises a nickel-based superalloy.

4. The airfoil of claim 3, wherein said nickel-based superalloy comprises a directionally solidified crystal structure.

5. The airfoil of claim 3, wherein said nickel-based superalloy comprises a single crystal.

6. The airfoil of claim 5, wherein said second material comprises Rh at a level of at least about 65 atomic percent.

7. The airfoil of claim 6, wherein said second material further comprises a quantity of additional material, said quantity of additional material comprising at least one supplementary element selected from the group consisting of Ti, V, Zr, Nb, Mo, Hf, Ta, and W.

8. The airfoil of claim 7, wherein said at least one supplementary element is present in said second material at a level of up to about 7 atomic percent.

9. The airfoil of claim 8, wherein said quantity of additional material comprises a plurality of supplementary elements, wherein each of the supplementary elements is selected from the group consisting of Ti, V, Zr, Nb, Mo, Hf, Ta, and W.

10. The airfoil of claim 9, wherein said quantity of additional material is present in said second material at a level at or below about 10 atomic percent.

11. The airfoil of claim 6, wherein said second material further comprises Cr.

12. The airfoil of claim 11, wherein the Cr is present at a level of up to about 25 atomic percent.

13. The airfoil of claim 11, wherein said second material further comprises Al.

14. The airfoil of claim 13, wherein the Al is present at a level of up to about 18 atomic percent.

15. The airfoil of claim 13, wherein said second material further comprises Ni.

16. The airfoil of claim 15, wherein the Ni is present at a level of up to about 45 atomic percent.

17. The airfoil of claim 1, wherein said wall further comprises a cross-sectional thickness, and said portion of said wall comprising said second material comprises from about 0.13 mm (about 0.005") to about 0.64 mm (about 0.025") of said cross-sectional thickness of said wall.

18. The airfoil of claim 17, wherein said portion of said wall comprises from about 0.13 mm (about 0.005") to about 0.38 mm (about 0.015") of said cross-sectional thickness of said wall.

19. The airfoil of claim 1, wherein said airfoil comprises at least one internal cooling-air channel.

20. The airfoil of claim 1, wherein said second material further comprises a plurality of cooling holes.

21. The airfoil of claim 1, further comprising a coating selected from the group consisting of a ceramic thermal barrier coating, a metallic environmentally resistant coating, and combinations thereof.

22. A gas turbine airfoil, comprising:
   a wall, said wall defining the perimeter of said airfoil and comprising a leading edge section, a trailing edge section, and a cross-sectional thickness, wherein a majority of the surface area of said wall comprises a nickel-based superalloy, and at least one portion of said wall comprises a material selected from the group consisting of Rh, Pt, Pd, and mixtures thereof and further comprises a metal selected from the group consisting of Ir, Ru, and mixtures thereof, at a level of up to about 5 atomic percent,
   said at least one portion of said wall comprising from about 0.13 mm (about 0.005") to about 0.64 mm (about 0.025") of said cross-sectional thickness of said wall and located in at least one section of said wall selected from the group consisting of the leading edge section and the trailing edge section.

23. A method for repairing a gas turbine airfoil, said method comprising:
   a. providing an airfoil comprising a wall, said wall defining the perimeter of said airfoil and comprising a leading edge section and a trailing edge section, and further comprising a first material with a melting temperature and an oxidation resistance;
   b. removing at least one portion of said wall, said at least one portion located in at least one section of said wall selected from the leading edge and the trailing edge;
   c. providing a second material, said second material having an oxidation resistance that is greater than the oxidation resistance of the first material and a melting temperature that is at least about 83° C. (about 150 degrees Fahrenheit) greater than the melting temperature of said first material, wherein said second material comprises a material selected from the group consisting of Rh, Pt, Pd, and mixtures thereof, and wherein said second material further comprises a metal selected from the group consisting of Ir, Ru, and mixtures thereof, at a level of up to about 5 atomic percent; and d. disposing said second material onto said wall in the at least one section where said at least one portion of said wall was removed.

24. The method of claim 23, wherein said airfoil comprises a gas turbine component selected from the group consisting of a blade and a vane.

25. The method of claim 23, wherein said first material comprises a nickel-based superalloy.

26. The method of claim 25, wherein said nickel-based superalloy comprises a directionally solidified crystal structure.

27. The method of claim 25, wherein said nickel-based superalloy comprises a single crystal.

28. The method of claim 27, wherein said second material comprises Rh at a level of at least about 65 atomic percent.

29. The method of claim 28, wherein said second material further comprises a quantity of additional material, said quantity of additional material comprising at least one supplementary element selected from the group consisting of Ti, V, Zr, Nb, Mo, Hf, Ta, and W.

30. The method of claim 29, wherein said at least one supplementary element is present in said second material at a level of up to about 7 atomic percent.

31. The method of claim 30, wherein said quantity of additional material comprises a plurality of supplementary elements, wherein each of the supplementary elements is selected from the group consisting of Ti, V, Zr, Nb, Mo, Hf, Ta, and W.

32. The method of claim 31, wherein said quantity of additional material is present in said second material at a level at or below about 10 atomic percent.

33. The method of claim 32, wherein said second material further comprises Cr.

34. The method of claim 33, wherein the Cr is present at a level of up to about 25 atomic percent.

35. The method of claim 33, wherein said second material further comprises Al.

36. The method of claim 35, wherein the Al is present at a level of up to about 18 atomic percent.

37. The method of claim 35, wherein said second material further comprises Ni.

38. The method of claim 37, wherein the Ni is present at a level of up to about 45 atomic percent.

39. The method of claim 23, wherein said wall further comprises a cross-sectional thickness, and disposing said second material is accomplished such that said second material comprises from about 0.13 mm (about 0.005") to about 0.64 mm (about 0.025") of said cross-sectional thickness of said wall.

40. The method of claim 39, wherein disposing is accomplished such that said second material comprises from about 0.13 mm (about 0.005") to about 0.38 mm (about 0.015") of said cross-sectional thickness of said wall.

41. The method of claim 23, wherein disposing comprises depositing said second material by a process selected from the group consisting of electron beam physical vapor deposition, chemical vapor deposition, ion plasma deposition, thermal spraying, electroplating, and laser powder deposition.

42. The method of claim 41, wherein disposing further comprises depositing said second material directly on the airfoil wall.

43. The method of claim 23, wherein providing said second material comprises providing a braze tape.

44. The method of claim 23, wherein providing said second material comprises providing a freestanding insert.

45. The method of claim 44, wherein said insert comprises a plurality of cooling holes.

46. The method of claim 44, wherein disposing further comprises joining said insert to said wall.

47. The method of claim 46, wherein joining comprises a process selected from the group consisting of brazing, welding, and diffusion bonding.

48. The method of claim 23, further comprising machining said airfoil to desired final dimensions.

49. The method of claim 23, further comprising heat treating said airfoil.

50. The method of claim 23, further comprising applying a coating to said airfoil, said coating selected from the group consisting of a ceramic thermal barrier coating, a metallic environmentally resistant coating, and combinations thereof.

51. The method of claim 23, further comprising creating a plurality of cooling holes in said second material.

52. The method of claim 51, wherein creating said plurality of cooling holes is accomplished by a process selected from the group consisting of electrode discharge machining, laser drilling, and electron beam drilling.

53. A method for repairing a gas turbine airfoil, said method comprising:
  a. providing an airfoil comprising a wall, said wall defining the perimeter of said airfoil and having a cross-sectional wall thickness, said wall comprising a leading edge section and a trailing edge section, and further comprising a nickel-based superalloy;
  b. removing at least one portion of said wall, said at least one portion located in at least one section of said wall selected from the leading edge section and the trailing edge section;
  c. providing a material in the form of a freestanding insert, said material selected from the group consisting of Rh, Pt, Pd, and mixtures thereof and further comprising a metal selected from the group consisting of Ir, Ru, and mixtures thereof, at a level of up to about 5 atomic percent;
  d. disposing said material onto said wall at the at least one section where said at least one portion of said wall was removed such that said material comprises from about 0.13 mm (about 0.005") to about 0.64 mm (about 0.025") of said cross-sectional thickness of said wall; and
  e. heat-treating said airfoil.

54. A method for manufacturing a gas turbine airfoil, said airfoil comprising a wall, said wall having a cross-sectional thickness that is specified to a nominal dimension, said wall defining the perimeter of said airfoil and comprising a leading edge section and a trailing edge section, and further comprising a first material with a melting temperature and an oxidation resistance; said method comprising:
  a. providing an airfoil with a deficit in cross-sectional wall thickness, relative to said specified nominal cross-sectional wall thickness dimension, in at least one section of said wall, said section selected from the leading edge section and the trailing edge section;
  b. providing a second material, said second material having an oxidation resistance that is greater than the oxidation resistance of said first material and a melting temperature that is at least about 83° C. (about 150 degrees Fahrenheit) greater than the melting temperature of said first material, wherein said second material comprises a material selected from the group consisting of Rh, Pt, Pd, and mixtures thereof, and wherein said second material further comprises a metal selected from the group consisting of Ir, Ru, and mixtures thereof, at a level of up to about 5 atomic percent; and c. disposing said second material onto the wall at said at least one section such that said deficit in cross-sectional wall thickness is eliminated.

55. The method of claim 54, wherein said airfoil comprises a gas turbine component selected from the group consisting of a blade and a vane.

56. The method of claim 54, wherein said first material comprises a nickel-based superalloy.

57. The method of claim 56, wherein said nickel-based superalloy comprises a directionally solidified crystal structure.

58. The method of claim 56, wherein said nickel-based superalloy comprises a single crystal.

59. The method of claim 58, wherein said second material comprises Rh at a level of at least about 65 atomic percent.

60. The method of claim 59, wherein said second material further comprises a quantity of additional material, said quantity of additional material comprising at least one supplementary element selected from the group consisting of Ti, V, Zr, Nb, Mo, Hf, Ta, and W.

61. The method of claim 60, wherein said at least one supplementary element is present in said second material at a level of up to about 7 atomic percent.

62. The method of claim 61, wherein said quantity of additional material comprises a plurality of supplementary elements, wherein each of the supplementary elements is selected from the group consisting of Ti, V, Zr, Nb, Mo, Hf, Ta, and W.

63. The method of claim 62, said quantity of additional material is present in said second material at a level at or below about 10 atomic percent.

64. The method of claim 58, wherein said second material further comprises Cr.

65. The method of claim 64, wherein the Cr is present at a level of up to about 25 atomic percent.

66. The method of claim 65, wherein said second material further comprises Al.

67. The method of claim 66, wherein the Al is present at a level of up to about 18 atomic percent.

68. The method of claim 66, wherein said second material further comprises Ni.

69. The method of claim 68, wherein the Ni is present at a level of up to about 45 atomic percent.

70. The method of claim 54, wherein disposing said second material is accomplished such that said second material comprises about 0.13 mm (about 0.005") to about 0.64 mm (about 0.025") of said cross-sectional thickness of said wall.

71. The method of claim 70, wherein disposing said second material is accomplished such that said second material comprises from about 0.13 mm (about 0.005") to about 0.38 mm (about 0.015") of said cross-sectional thickness of said wall.

72. The method of claim 64, wherein disposing comprises depositing said second material by a process selected from the group consisting of electron beam physical vapor deposition, chemical vapor deposition, ion plasma deposition, thermal spraying, electroplating, and laser powder deposition.

73. The method of claim 72, wherein disposing further comprises depositing said second material directly on the airfoil substrate.

74. The method of claim 54, wherein providing said second material comprises providing a braze tape.

75. The method of claim 54, wherein providing said second material comprises providing a freestanding insert.

76. The method of claim 75, wherein said airfoil comprises at least one internal cooling-air channel.

77. The method of claim 75, wherein disposing further comprises joining said insert to said wall.

78. The method of claim 77, wherein joining comprises a process selected from the group consisting of brazing, welding, and diffusion bonding.

79. The method of claim 54, further comprising machining said 86.

80. The method of claim 54, further comprising heat treating said airfoil.

81. The method of claim 54, further comprising applying a coating to said airfoil, said coating selected from the group consisting of a ceramic thermal barrier coating, a metallic environmentally resistant coating, and combinations thereof.

82. The method of claim 54, further comprising creating a plurality of cooling holes in said insert.

83. The method of claim 82, wherein creating said plurality of cooling holes is accomplished by a process selected from the group consisting of electrode discharge machining, laser drilling, and electron beam drilling.

84. A method for manufacturing a gas turbine airfoil, said airfoil comprising a wall, said wall having a cross-sectional thickness that is specified to a nominal dimension, said wall defining the perimeter of said airfoil and comprising a leading edge section and a trailing edge section, and further comprising a nickel-based superalloy, said method comprising:

a. providing an airfoil with a deficit in cross-sectional wall thickness relative to said specified nominal cross-sectional wall thickness dimension, in at least one section of said wall, said section selected from the leading edge section and the trailing edge section;

b. providing a material selected from the group consisting of Rh, Pt, Pd, and mixtures thereof and further comprising a metal selected from the group consisting of Ir, Ru, and mixtures thereof, at a level of up to about 5 atomic percent;

c. disposing said material onto the wall at said at least one section such that said second material comprises about 0.13 mm (about 0.005") to about 0.64 mm (about 0.025") of said cross-sectional thickness of said wall and such that said deficit in cross-sectional wall thickness is eliminated; and d. heat treating said airfoil.

85. An insert for repair and manufacture of a gas turbine airfoil, said airfoil comprising a wall, said wall having an outer surface, said wall defining the perimeter of said airfoil and comprising a leading edge section and a trailing edge section, said wall further comprising a first material with a melting temperature and an oxidation resistance, said insert comprising an outer surface that is shaped such that said outer surface of said insert conforms with said outer surface of said wall at a section of said wall selected from the group consisting of the leading edge section and the trailing edge section, said insert comprising a second material, said second material having oxidation resistance that is greater than the oxidation resistance of said first material and a melting temperature that is at least about 83° C. (about 150 degrees Fahrenheit) greater than the melting temperature of said first material, wherein said second material comprises a material selected from the group consisting of Rh, Pt, Pd, and mixtures thereof, and wherein said second material further comprises a metal selected from the group consisting of Ir, Ru, and mixtures thereof, at a level of up to about 5 atomic percent.

86. The insert of claim 85, wherein said airfoil comprises a gas turbine component selected from the group consisting of a blade and a vane.

87. The insert of claim 85, wherein said first material comprises a nickel-based superalloy.

88. The insert of claim 87, wherein said nickel-based superalloy comprises a directionally solidified crystal structure.

89. The insert of claim 88, wherein said nickel-based superalloy comprises a single crystal.

90. The insert of claim 89, wherein said second material comprises Rh at a level of at least about 65 atomic percent.

91. The insert of claim 89, wherein said second material further comprises a quantity of additional material, said quantity of additional material comprising at least one supplementary element selected from the group consisting of Ti, V, Zr, Nb, Mo, Hf, Ta, and W.

92. The insert of claim 91, wherein said at least one supplementary element is present in said second material at a level of up to about 7 atomic percent.

93. The insert of claim 92, wherein said quantity of additional material comprises a plurality of supplementary elements, wherein each of the supplementary elements is selected from the group consisting of Ti, V, Zr, Nb, Mo, Hf, Ta, and W.

94. The insert of claim 93, wherein said quantity of additional material is present in said second material at a level at or below about 10 atomic percent.

95. The insert of claim 94, wherein said second material further comprises Cr.

96. The insert of claim 95, wherein the Cr is present at a level of up to about 25 atomic percent.

97. The insert of claim 95, wherein said second material further comprises Al.

98. The insert of claim 97, wherein the Al is present at a level of up to about 18 atomic percent.

99. The insert of claim 97, wherein said second material further comprises Ni.

100. The insert of claim 99, wherein the Ni is present at a level of up to about 45 atomic percent.

101. The insert of claim 85, wherein said insert further comprises a cross-sectional thickness, wherein said cross-sectional thickness is in the range from about 0.13 mm (about 0.005") to about 0.64 mm (about 0.025").

102. The insert of claim 101, wherein said cross-sectional thickness is in the range from about 0.13 mm (about 0.005") to about 0.38 mm (about 0.015").

103. The insert of claim 85, wherein said airfoil comprises at least one internal cooling-air channel.

104. The insert of claim 85, wherein said second material further comprises a plurality of cooling holes.

105. The insert of claim 85, wherein said insert is fabricated using a process selected from the group consisting of casting, forging, extruding, and in-situ processing of braze tape.

106. The insert of claim 85, wherein said insert is fabricated by a process selected from the group consisting of electron beam physical vapor deposition, chemical vapor deposition, ion plasma deposition, thermal spraying, and electroplating.

107. An insert for repair and manufacture of a gas turbine airfoil, said airfoil comprising a wall, said wall having an outer surface, said wall defining the perimeter of said airfoil and comprising a leading edge section and a trailing edge section, said wall further comprising nickel-based superalloy;

said insert having a cross-sectional thickness in the range of from about 0.13 mm (about 0.005") to about 0.64 mm (about 0.025"), said insert comprising an outer surface that is shaped such that said outer surface of said insert conforms with said outer surface of said wall at a section of said wall selected from the group consisting of the leading edge section and the trailing edge section, said insert comprising a material selected from the group consisting of Rh, Pt, Ru, Pd, and mixtures thereof and further comprising a metal selected from the group consisting of Ir, Ru, and mixtures thereof, at a level of up to about 5 atomic percent.

* * * * *